US010987993B2

(12) United States Patent
Stacey

(10) Patent No.: US 10,987,993 B2
(45) Date of Patent: Apr. 27, 2021

(54) THERMAL MANAGEMENT SYSTEM FOR ELECTRIFIED VEHICLE

(71) Applicant: Ford Global Technologies, LLC, Dearborn, MI (US)

(72) Inventor: Peter Stacey, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 237 days.

(21) Appl. No.: 15/976,457

(22) Filed: May 10, 2018

(65) Prior Publication Data

US 2019/0344635 A1  Nov. 14, 2019

(51) Int. Cl.
*B60H 1/00* (2006.01)
*B60H 1/03* (2006.01)
*B60H 1/06* (2006.01)
*F01P 7/14* (2006.01)

(52) U.S. Cl.
CPC ..... *B60H 1/00271* (2013.01); *B60H 1/00328* (2013.01); *B60H 1/00342* (2013.01); *B60H 1/00385* (2013.01); *B60H 1/00885* (2013.01); *B60H 1/03* (2013.01); *B60H 1/06* (2013.01); *F01P 7/14* (2013.01); *B60H 2001/00307* (2013.01); *F01P 2037/02* (2013.01); *F01P 2060/045* (2013.01)

(58) Field of Classification Search
CPC ............ B60H 1/00271; B60H 1/00328; B60H 1/00342; B60H 1/00385; B60H 1/03; B60H 1/06; B60H 2001/00307; F01P 7/14; F01P 2037/02; F01P 2060/045
USPC ....................................... 165/202
See application file for complete search history.

(56) References Cited

U.S. PATENT DOCUMENTS

| 6,427,640 | B1* | 8/2002 | Hickey ................. F01M 5/007 123/41.31 |
| 6,450,275 | B1* | 9/2002 | Gabriel .................. F01P 7/165 180/65.23 |
| 6,616,059 | B2 | 9/2003 | Sabhapathy et al. |
| 6,772,715 | B2 | 8/2004 | Pfeffinger et al. |
| 8,459,389 | B2 | 6/2013 | Myers et al. |
| 10,107,175 | B1* | 10/2018 | Bowler ..................... F01P 7/14 |
| 10,132,403 | B1* | 11/2018 | Gooden ............. F16H 57/0475 |

(Continued)

FOREIGN PATENT DOCUMENTS

GB        2429763 B       1/2011

*Primary Examiner* — Tho V Duong
*Assistant Examiner* — Raheena R Malik
(74) *Attorney, Agent, or Firm* — David B. Kelley; Brooks Kushman P.C.

(57) ABSTRACT

A vehicle thermal management system including an engine, a vehicle cabin, a transmission thermal loop, and a controller is provided. The transmission thermal loop may include a transmission assembly in operational communication with the engine and a cabin thermal loop. The controller may be programmed to, responsive to detection of an engine off condition, output to a shut-off valve an open command such that heat from the transmission thermal loop transfers to the cabin thermal loop to warm the vehicle cabin. The controller may be further programmed to, responsive to detection of a cabin heater core having a temperature above a predetermined threshold, output a command to a coolant heater of an engine thermal loop to direct warm or cold fluid to the transmission assembly based on a detected transmission thermal loop temperature.

13 Claims, 5 Drawing Sheets

(56) References Cited

U.S. PATENT DOCUMENTS

| | | | |
|---|---|---|---|
| 2014/0097261 A1* | 4/2014 | Blumenstock | B60H 1/00492 237/5 |
| 2017/0241324 A1* | 8/2017 | Liu | F02N 19/10 |
| 2018/0298806 A1* | 10/2018 | Sutherland | F01P 3/02 |

* cited by examiner

THERMAL MANAGEMENT SYSTEM FOR ELECTRIFIED VEHICLE

TECHNICAL FIELD

The present disclosure relates to vehicle thermal management systems to assist in managing thermal conditions of vehicle components such as transmission assemblies.

BACKGROUND

Vehicle thermal management systems may include components and control strategies to manage thermal conditions of driveline assemblies. These control strategies may operate regardless of an operation status of an internal combustion engine. When the internal combustion engine is in an off state, coolant flow to vehicle cabin and transmission thermal loops may be minimal or cease. During low engine speed operating conditions, coolant flow rates are relatively low, resulting in reduced heat transfer potential to manage transmission fluid temperatures and vehicle cabin conditions.

SUMMARY

A vehicle thermal management system includes an engine, a vehicle cabin, a transmission thermal loop, and a controller. The transmission thermal loop includes a transmission assembly in operational communication with the engine and a cabin thermal loop. The controller is programmed to, responsive to detection of an engine off condition, output to a shut-off valve an open command such that heat from the transmission thermal loop transfers to the cabin thermal loop to warm the vehicle cabin. The controller may be further programmed to, responsive to detection of a cabin heater core having a temperature above a predetermined threshold, output a command to a coolant heater of an engine thermal loop to direct warm or cold fluid to the transmission assembly based on a detected transmission thermal loop temperature. The controller may be further programmed to, responsive to detection of a cabin heater core having a temperature less than a predetermined threshold, output a command to a coolant heater of an engine thermal loop to direct heat generated by the engine to the cabin thermal loop. The controller may be further programmed to output a command to a coolant heater of an engine thermal loop to activate and supply heat to the transmission thermal loop. The shut-off valve may operate based on proportional flow or variable flow. The system may further include an engine thermal loop including the engine. The engine thermal loop, the transmission thermal loop, and the cabin thermal loop may collectively include only one coolant pump. The controller may be further programmed to direct engine coolant to flow to a transmission oil heat exchanger based on a detected engine coolant temperature being less than a detected transmission coolant temperature.

A vehicle thermal management system includes an engine thermal loop, a transmission oil heat exchanger (TOHEX), a coolant heater, and a controller. The engine thermal loop is coupled to a transmission thermal loop and a cabin thermal loop. The TOHEX is in fluid communication with a transmission and a shut-off valve. The coolant heater is of the engine thermal loop and is in selective fluid communication with the transmission thermal loop and the cabin thermal loop. The controller is programmed to, responsive to detection of a cabin temperature less than a predetermined threshold and regardless of an engine operating condition, output a command to the shut-off valve to release warmed fluid from the transmission thermal loop to the cabin thermal loop and output a command to the coolant heater to release heated fluid to the cabin thermal loop to increase the cabin temperature. The thermal loops may be included in a hybrid electric vehicle. The controller may be further programmed to, responsive to detection of the transmission thermal loop having a temperature less than a predetermined threshold, output a command to the coolant heater to release warmed fluid from the engine thermal loop to the TOHEX. The TOHEX may be a stack-plate unit including separate channels for fluid from the engine thermal loop and fluid from the transmission thermal loop to flow through and exchange heat. The controller may be further programmed to activate a coolant pump of the engine thermal loop and an automatic transmission fluid pump of the transmission thermal loop to simultaneously transfer fluid to the cabin thermal loop to warm a vehicle cabin. The system may further include a coolant pump of the engine thermal loop. The controller may be further programmed to activate the coolant pump to maintain a flow rate of fluid traveling to the transmission thermal loop responsive to detection of an engine off condition or an engine idle condition. The controller may be further programmed to limit coolant flow via the TOHEX based on detection of a transmission fluid temperature being greater than a predetermined set max limit.

A vehicle thermal management system control strategy outputs, via a controller, a command to open a shut-off valve to fluidly connect a transmission thermal loop and a cabin thermal loop such that heat from the transmission thermal loop warms the cabin thermal loop responsive to detection of a vehicle cabin temperature less than a predetermined threshold and identification that an engine on condition is not present. The identification may be based on a detected temperature of fluid flowing through an engine thermal loop selectively in fluid communication with the transmission thermal loop and the cabin thermal loop. The identification may be based on detection of whether an electric-only mode is activated. The controller may further output a command to activate a coolant pump to send warming fluid to the cabin thermal loop responsive to detection of a heater core fluid less than a predetermined threshold. The transmission thermal loop may include a transmission oil heat exchanger, a transmission, an automatic transmission fluid pump and the shut-off valve. Closure of the shut-off valve may retain transmission thermal loop fluid therein only. The control strategy may further output a command to direct engine coolant to flow to a transmission oil heat exchanger responsive to a detected engine coolant temperature being less than a detected transmission coolant temperature.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
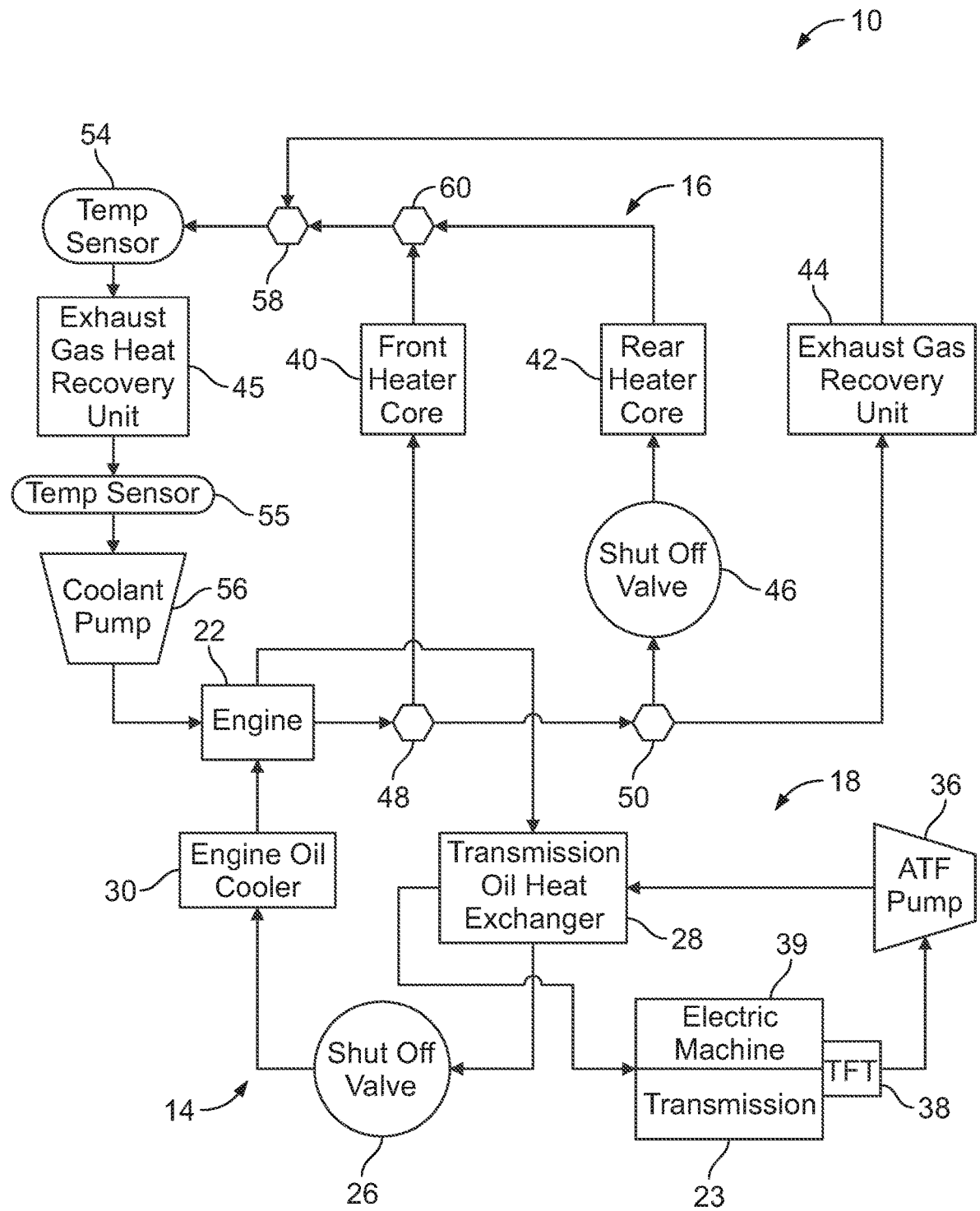
FIG. 1 is a schematic diagram illustrating an example of a portion of an architecture for a vehicle thermal management system of a hybrid electric vehicle.

FIG. 1 is a schematic diagram illustrating a portion of an example of an architecture of a vehicle thermal management system, referred to generally as a thermal management system 10 herein. The thermal management system 10 is for a hybrid electric vehicle (HEV). The thermal management system 10 includes an engine thermal loop 14, a cabin thermal loop 16, and a transmission thermal loop 18. The engine 22 is operably coupled to a transmission 23. A first shut-off valve 26 controls a flow of fluid from a transmission oil heat exchanger (TOHEX) 28 en route to the engine 22. An engine oil cooler 30 regulates thermal conditions of the fluid traveling from the first shut-off valve 26 to the engine 22. For example, in a scenario in which oil of the engine 22 is detected at a temperature above a predetermined threshold, e.g. too warm, the first shut-off valve 26 may be opened such that the engine oil cooler 30 may assist in reducing the oil temperature to within an acceptable temperature range.

An automatic transmission fluid (ATF) pump 36 controls a flow rate of fluid to the TOHEX 28 from the transmission 23 based on temperature conditions detected by a transmission temperature sensor (TFT) 38. The TOHEX 28 operates to exchange heat with fluid traveling through the engine 22 and fluid traveling through the transmission 23 and an electric machine 39.

The cabin thermal loop 16 includes a front heater core 40, a rear heater core 42, an exhaust gas recovery unit 44, and a second shut-off valve 46. The front heater core 40 is in fluid communication with a vehicle cabin (not shown) to provide heat to a front portion of the vehicle cabin. The rear heater core 42 is in fluid communication with a rear portion of the vehicle cabin to provide heat to a rear portion of the vehicle cabin. The exhaust gas recovery unit 44 absorbs gas heat into the coolant. The gas heat is captured by an exhaust gas heat recovery unit 45. In one example, the gas is a resultant of a combustion process of the engine 22.

The second shut-off valve 46 operates with a first junction 48 and a second junction 50 to manage a flow of fluid from the engine 22 to the front heater core 40 and the rear heater core 42. For example, fluid may travel from the engine 22 to the front heater core 40 via the first junction 48. Fluid travels from the engine 22 to the rear heater core 42 via the first junction 48, the second junction 50, and the second shut-off valve 46 when open.

The exhaust gas heat recovery unit 45 may capture exhaust gas heat from the combustion process for use in the thermal management system 10. A first temperature sensor 54 measures temperature conditions of fluid prior to entering the exhaust gas heat recovery unit 45. A second temperature sensor 55 measures temperature conditions of fluids exiting the exhaust gas heat recovery unit 45. For example, the second temperature sensor 55 may assist in providing temperature readings indicating whether the fluid is within or outside of a predetermined temperature range to trigger activation of other components to assist in maintaining the fluid temperature within the predetermined temperature range. A coolant pump 56 operates to control a flow of fluid coming from the exhaust gas heat recovery unit 45. The coolant pump 56 also operates to direct coolant through the engine thermal loop 14 and the cabin thermal loop 16. A third junction 58 and a fourth junction 60 operate to combine fluid from the heater cores and the exhaust gas recovery unit 44 en route to the exhaust gas heat recovery unit 45.

During operation, a vehicle cabin heat request positions the cabin thermal loop 16 ahead of the transmission thermal loop 18 in terms of thermal action priority. For example, a warm-up rate of the transmission 23 may be prolonged in the event a vehicle cabin heat request is made. In the event there is not a vehicle cabin heat request and a detected transmission fluid temperature is below a detected engine coolant temperature, then the thermal management system 10 may operate to direct fluid to the TOHEX 28 transmission 23 to assist in warming up the transmission 23.

In an event in which a temperature of the transmission fluid is detected at a calibrated value, for example 90° C., the first shut-off valve 26 may be opened for cooling of the transmission 23. In an event in which a temperature of the transmission fluid is detected at a higher calibrated value, for example 99° C., cooling of the transmission fluid increases in position within the thermal action priority. In sum, tradeoffs are balanced between heating or cooling of the transmission fluid with customer heat requests and engine coolant temperature. These tradeoffs may lead to thermal conditions within the vehicle cabin which are not acceptable to passengers.

Figure 2:
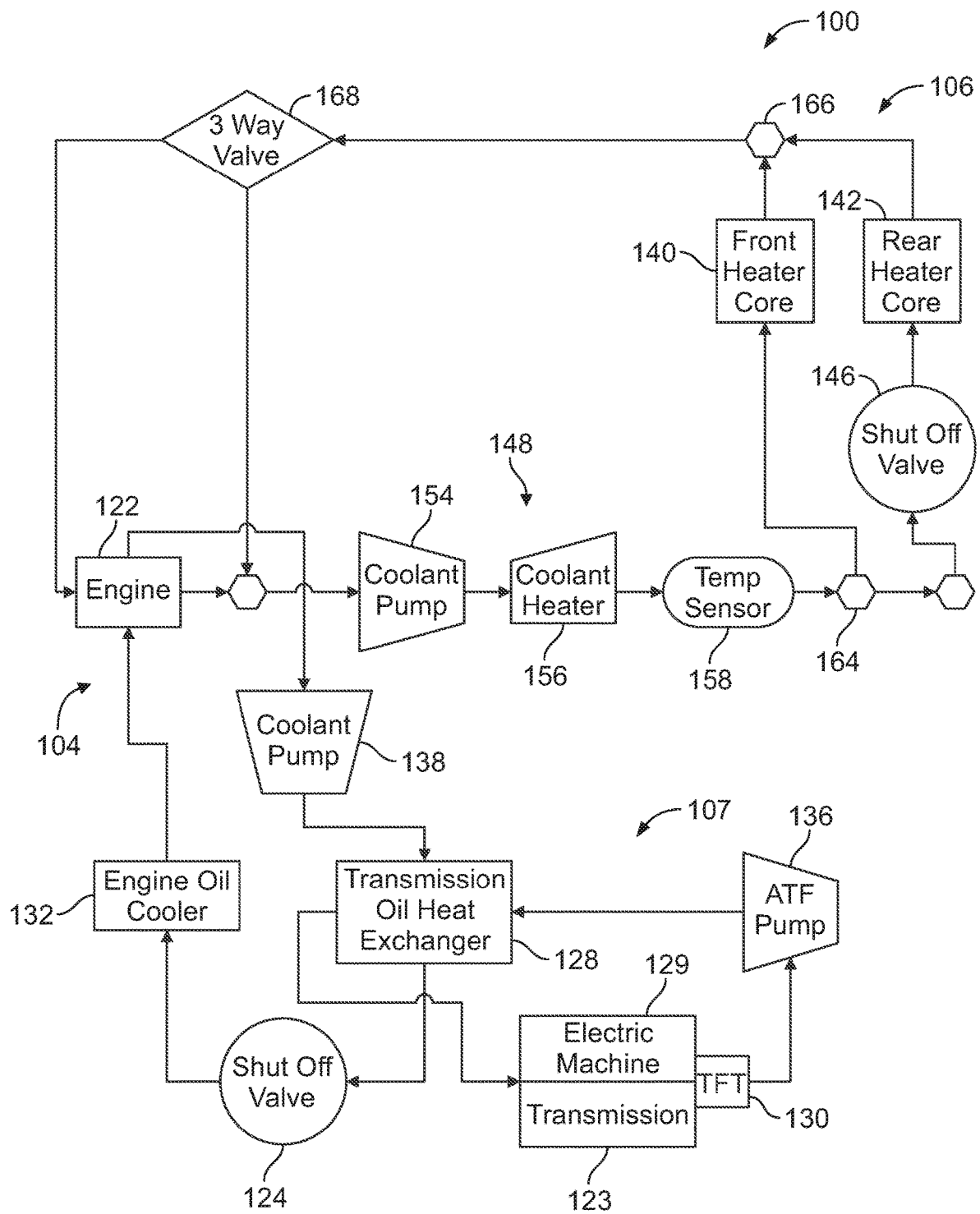
FIG. 2 is a schematic diagram illustrating an example of a portion of an architecture for a vehicle thermal management system of a plug-in hybrid electric vehicle.

FIG. 2 is a schematic diagram illustrating a portion of another example of an architecture of a vehicle thermal management system, referred to generally as a thermal management system 100 herein. The thermal management system 100 may operate with a plug-in hybrid electric vehicle (PHEV). The thermal management system 100 includes an engine thermal loop 104, a cabin thermal loop 106, and a transmission thermal loop 107. An engine 122 is operably coupled to a transmission 123. A first shut-off valve 124 controls a flow of fluid from a TOHEX 128 en route to the engine 122. The TOHEX 128 manages thermal conditions of fluid flowing within the transmission thermal loop 107 based on detected signals from a TFT 130 to manage thermal conditions of the transmission 123 and an electric machine 129.

An engine oil cooler 132 regulates thermal conditions of the fluid traveling from the first shut-off valve 124 to the engine 122. A first coolant pump 138 controls a flow rate of fluid in the engine thermal loop 104 including a flow rate of fluid from the engine 122 to the TOHEX 128. An ATF pump 136 controls a flow rate of fluid within the transmission thermal loop 107 based on thermal conditions detected by the TFT 130.

The cabin thermal loop includes a front heater core 140, a rear heater core 142, a second shut-off valve 146, and a thermal assembly 148. The front heater core 140 is in fluid communication with a vehicle cabin (not shown) to provide heat to a front portion of the vehicle cabin. The rear heater core 142 is in fluid communication with the vehicle cabin to provide heat to a rear portion of the vehicle cabin. The thermal assembly 148 includes a second coolant pump 154, a coolant heater 156, and a temperature sensor 158. The thermal assembly 148 operates to assist in providing heat to the vehicle cabin. For example, in a scenario in which the engine 122 is off or not warmed up, the thermal assembly 148 may operate to provide heat for the vehicle cabin. For example, the second coolant pump 154 operates to direct fluid flow based on signals from the temperature sensor 158 indicating thermal conditions of the coolant heater 156. The second coolant pump 154 may operate to direct fluid flow independent of an engine fluid flow rate.

A first junction 164, a second junction 166, and a three-way valve 168 operate with one another to direct fluid flow within the cabin thermal loop 106 and within the engine thermal loop 104. For example, the three-way valve 168 may selectively direct fluid to the heater cores from the engine 122 or independently from the second coolant pump 154.

During a cold start in an electric-only mode, the engine 122 is in an off state so the engine 122 does not provide heat accessible by the TOHEX 128 to manage thermal conditions of the transmission 123. During extended electric-only mode conditions, the first coolant pump 138 is needed to provide cooling assistance to the TOHEX 128. During a warm start in a hybrid mode, the first coolant pump 138 may assist in warming the transmission 123 only if the first shut-off valve 124 is open and in accordance to position within a thermal action priority.

The architecture of the thermal management system 100 presents several issues. For example, communication between the coolant heater 156 and the engine 122 may be inefficient due to lost thermal energy used to warm the engine 122. As another example, inclusion of the second coolant pump 154 increases a cost, a weight, and a complexity of the thermal management system 100 while reducing repair efficiency and packaging space.

Figure 3:
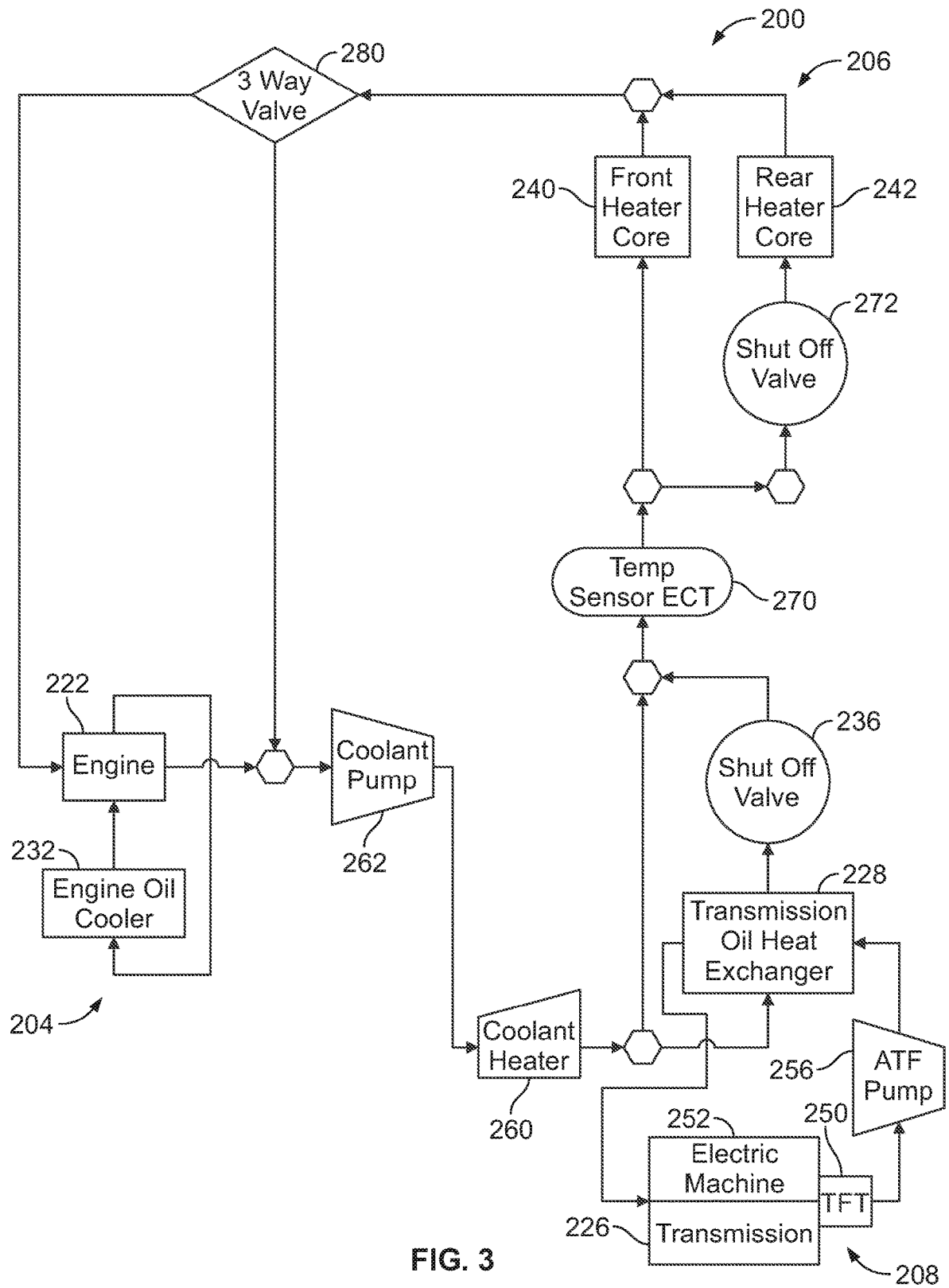
FIG. 3 is a schematic diagram illustrating an example of a portion of an architecture for a vehicle thermal management system of a plug-in hybrid electric vehicle.

FIG. 3 is a schematic diagram illustrating a portion of an example of an architecture of a vehicle thermal management system, referred to generally as a thermal management system 200 herein. The thermal management system 200 is for a PHEV though the thermal management system 200 may operate with other types of hybrid vehicles. A controller (not shown in FIG. 3) may be in operable communication with each component of the thermal management system 200 to control operation thereof. For example, the controller may include programming to operate control strategies as discussed in relation to FIGS. 4 and 5 below. The thermal management system 200 may include an engine thermal loop 204, a cabin thermal loop 206, and a transmission thermal loop 208. The engine thermal loop 204 is coupled to the cabin thermal loop 206 and the transmission thermal loop 208 to selectively exchange fluid to assist in managing thermal conditions of vehicle components of the thermal loops.

The engine thermal loop 204 may include an engine 222 operably coupled to a transmission 226 of the transmission thermal loop 208. The transmission thermal loop 208 includes components to assist in managing thermal conditions of the transmission 226 as further described below. An engine oil cooler 232 regulates thermal conditions of fluid traveling to the engine 222.

A first shut-off valve 236 controls a flow of fluid from a TOHEX 238 en route to a front heater core 240 and a rear a rear heater core 242. Optionally, the first shut-off valve 236 may be a three-way proportional valve located downstream of a junction adjacent a coolant heater described below. Alternatively, the first shut-off valve 236 may be a three-way variable valve. The TOHEX 228 manages thermal conditions of fluid flowing within the transmission thermal loop 208 near the transmission 226 and an electric machine 252 based on detected signals from a TFT sensor 250 to manage thermal conditions of the transmission 226 and the electric machine 252. An ATF pump 256 manages a flow rate of fluid through the transmission 226, the TOHEX 228, and the electric machine 252. The TOHEX 228 and the coolant heater 260 may operate with one another to maintain a temperature of the transmission 226 and the electric machine within a predetermined temperature range. For example, the transmission 226 may have a maximum efficiency when fluid is flowing therethrough at a temperature between 80° C. and 90° C. Efficiency of the electric machine 252 will generally improve as an operating temperature is reduced.

In this example, the TOHEX 228 may be a stack-plate embodiment having a structure such that fluid (e.g. engine coolant) from the engine 22 and transmission fluid may both flow through the TOHEX 228 without directly contacting one another. Heat from the transmission 226 may be transferred to the cabin thermal loop 206 to assist in managing thermal conditions of the vehicle cabin. In previous thermal management systems, heat from a transmission may instead have been 'lost' to the engine or lost as a result of thermal action priority.

A coolant heater 260 may adjust a temperature of fluid traveling from the engine 222 to the TOHEX 228 via a coolant pump 262. For example, the coolant heater 260 may operate to heat fluid to heat the TOHEX 228 when the engine 222 is not operating in an 'on' condition. In a cold-start scenario in electric only mode, the coolant heater 260 may operate to provide heat to warm up the transmission 226. In one example, the coolant heater 260 may be a positive temperature coefficient (PTC) heater.

The thermal management system 200 includes only one coolant pump 262 in comparison to the thermal management system 100 which included two coolant pumps (e.g. the first coolant pump 138 and the second coolant pump 154). Removal of the second coolant pump provides advantages in terms of a reduction to system cost, a reduction to system weight and complexity, and an increase in repair efficiency and available packaging space.

An engine coolant temperature (ECT) sensor 270 and a second shut-off valve 272 may operate with one another to control a flow of fluid to the front heater core 240 and the rear heater core 242 based on, for example, temperatures detected by the ECT sensor 270. A temperature of the ECT may be based on passenger climate requests. A temperature of the transmission fluid may be selected based on optimal or most efficient transmission fluid operating temperatures. A three-way valve 280 may selectively direct fluid from the cabin thermal loop 206 to the engine 222 or the coolant pump 262.

The thermal management system 200 may operate to direct heat from the transmission thermal loop 208 to the vehicle cabin thermal loop 206 based on vehicle operating conditions and control strategies. For example, a control strategy may direct the first shut-off valve 236 to open such that heat from the transmission thermal loop 208 may be transferred to the cabin thermal loop 206 based on a passenger request and limited availability of heat within the cabin thermal loop 206.

Figure 4:
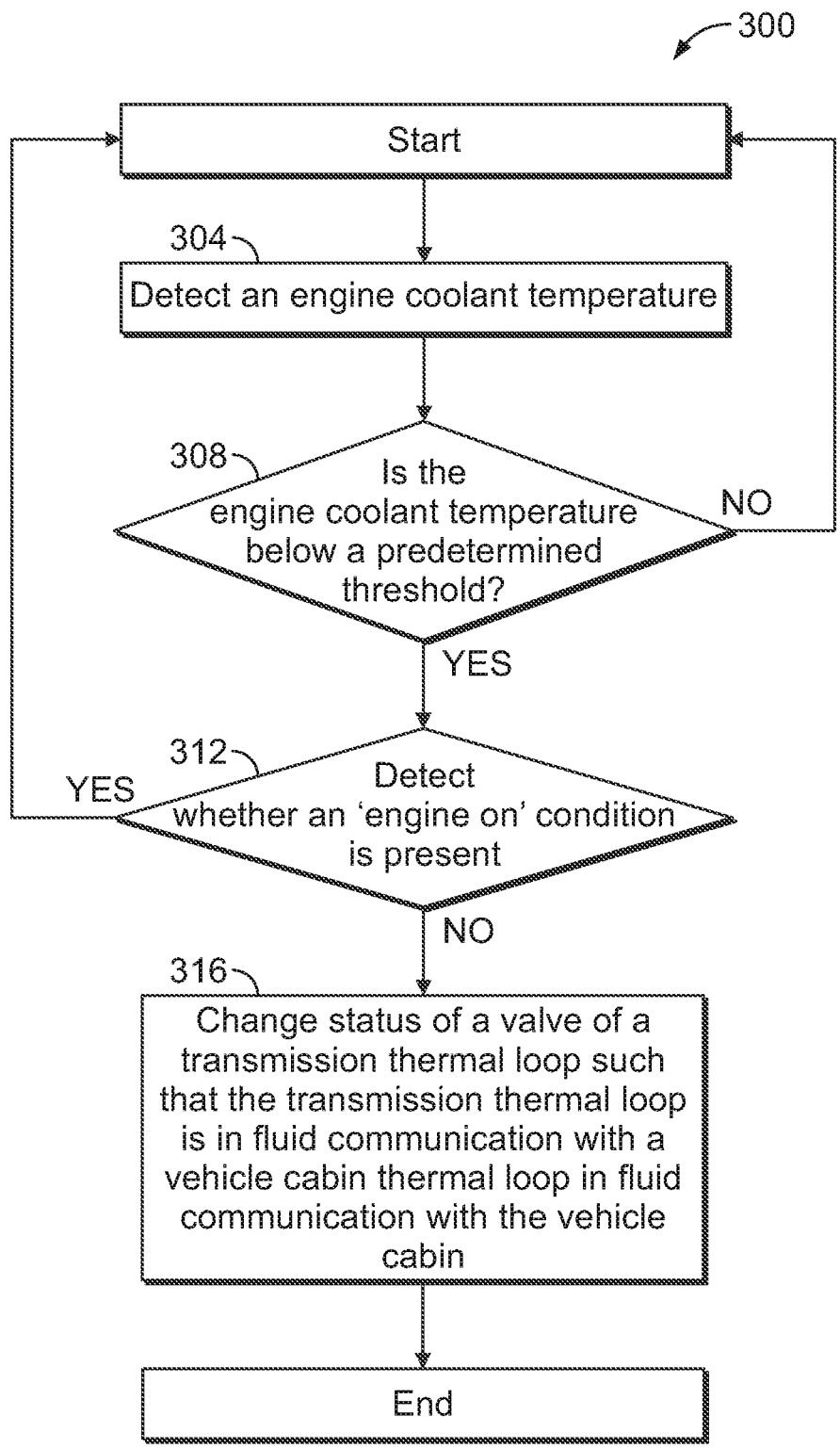
FIG. 4 is a flow chart illustrating an example of a portion of a control strategy for a vehicle thermal management system.

FIG. 4 is a flow chart illustrating an example of a control strategy for a vehicle thermal management system, referred to as a control strategy 300 herein. The control strategy 300 may be used, for example, with a vehicle thermal management system such as the thermal management system 200. The vehicle thermal management system may include an engine thermal loop, a vehicle cabin thermal loop, and a transmission thermal loop. In operation 304, an engine coolant temperature may be detected by a temperature sensor. A vehicle cabin control request may identify a target engine coolant temperature. The temperature sensor may send the detected temperature to a controller in electrical communication with the vehicle thermal management system.

The controller may identify whether the engine coolant temperature is above or below a predetermined temperature threshold in operation 308. The predetermined temperature threshold may be based on a vehicle cabin temperature request deemed comfortable for a passenger based on, for example, current ambient temperatures outside the vehicle.

In an event in which the detected engine coolant temperature has met the target engine coolant temperature, the controller may detect whether an 'engine on' condition is present in operation 312. The controller may communicate with the engine to identify whether the engine is operating or in an off mode. The controller may also detect conditions of vehicle components associated with the engine to identify an engine operating status. For example, the controller may receive signals indicating a temperature of coolant flowing through the engine. In the event a temperature of the coolant is below a predetermined threshold, the controller may identify the engine as operating in an off condition.

The controller may examine engine status and vehicle cabin temperature to identify whether to selectively transfer heat from the transmission loop to the vehicle cabin thermal loop. For example, the controller may direct a change in a transmission thermal loop valve status in operation 316. Opening the valve may provide heat from the transmission thermal loop to the vehicle cabin thermal loop. The heat may be generated during transmission operation. The heat may be used to assist in managing conditions of the vehicle cabin in fluid communication with the vehicle cabin thermal loop.

Optionally, the controller may receive signals including detected temperature conditions of the transmission thermal loop to identify whether coupling the transmission thermal loop to the vehicle cabin thermal loop provides advantages from a heat standpoint. Optionally, the engine thermal loop may include a coolant heater, such as a PTC heater, to selectively provide heat to the transmission thermal loop or the vehicle cabin thermal loop.

The control strategy 300 may be used, for example, during a cold start when the vehicle is in electric-only mode and thus the engine will not be activated. The control strategy 300 may be used, for example, during a scenario in which the engine has not been activated recently such that fluids of the engine thermal loop are at a temperature below a predetermined threshold, e.g. the fluids are not warm enough to provide heat to the vehicle cabin thermal loop.

Figure 5:
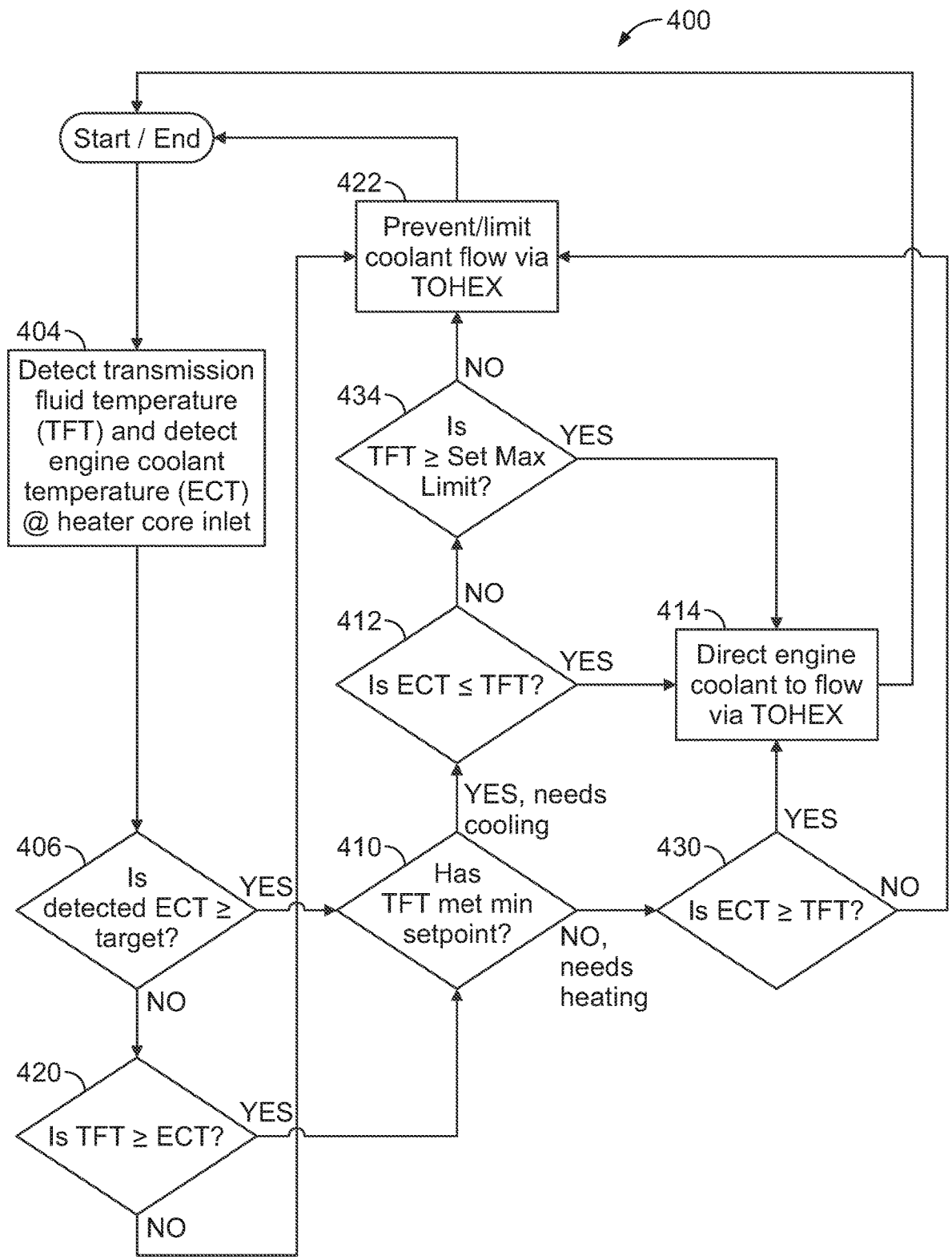
FIG. 5 is a flow chart illustrating an example of a portion of a control strategy for a vehicle thermal management system.

FIG. 5 is a flow chart illustrating an example of a control strategy for a vehicle thermal management system, referred to as a control strategy 400 herein. The control strategy 400 may be used with, for example, the thermal management system 200. In this example, the control strategy 400 is operating based on a thermal priority hierarchy in which heating a vehicle cabin is a first priority. In operation 404, a controller of the vehicle thermal management system may direct sensors to detect a temperature of a transmission fluid of a transmission thermal loop and may detect a temperature of engine coolant at a heater core inlet of a vehicle cabin thermal loop.

In operation 406, the detected engine coolant temperature may be compared to a predetermined target. The predetermined target may be selected based on a passenger temperature request or expected climate thermal loads. In a scenario in which the detected engine coolant temperature is equal to or greater than the predetermined target, the controller may compare the transmission fluid temperature to a minimum set point in operation 410. In one example, the minimum set point may be based on a state of charge of a high voltage battery.

If the temperature of the transmission fluid has met the minimum set point, the transmission fluid may be categorized as 'needing cooling' and the controller may compare the engine coolant temperature to the transmission fluid temperature in operation 412. If the detected engine coolant temperature is less than the detected transmission fluid temperature, the controller may direct engine coolant to flow via a TOHEX to assist in cooling the transmission thermal loop in operation 414.

If the detected engine coolant temperature is less than the predetermined target in operation 406, the controller may compare the transmission fluid temperature and the engine coolant temperature in operation 420. If the detected transmission fluid temperature is identified as greater than or equal to the detected engine coolant temperature, the controller may then examine whether the transmission fluid temperature has met the minimum setpoint in operation 410. In one example, the minimum setpoint may be substantially equal to between 80° C. and 90° C. If the detected transmission fluid temperature is identified as less than the engine coolant temperature in operation 420, the controller may prevent or limit engine coolant flow to the TOHEX in operation 422.

If the temperature of the transmission fluid is identified as not meeting the minimum setpoint in operation 410, the transmission fluid may be categorized as 'needing heating' and the controller may compare the engine coolant temperature to the transmission fluid temperature in operation 430. If the engine coolant temperature is identified as being greater than the transmission fluid temperature, the controller may direct engine coolant to flow via the TOHEX to assist in warming the transmission thermal loop in operation 414.

If the temperature of the engine coolant is identified as greater than the transmission fluid temperature in operation 412, the controller may compare the transmission fluid temperature to a set maximum limit in operation 434. The set maximum limit may be approximately 99° C. If the transmission fluid temperature is identified as greater than the maximum limit in operation 434, the controller may direct the engine coolant to flow via the TOHEX to assist in cooling in operation 414. If the transmission fluid temperature is identified as less than the maximum limit in operation 434, the controller may prevent or limit coolant flow via the TOHEX in operation 422.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle thermal management system comprising:
an engine and a vehicle cabin;
a transmission thermal loop including a transmission assembly and a transmission oil heat exchanger (TOHEX) in fluid communication with the transmission assembly and a shut-off valve, the transmission thermal loop in operational communication with both the engine and a cabin thermal loop;
a coolant heater of the engine thermal loop in selective fluid communication with the transmission thermal loop and the cabin thermal loop; and
a controller programmed to, responsive to detection of an engine off condition, output to the shut-off valve an open command such that heat from the transmission thermal loop transfers to the cabin thermal loop to warm the vehicle cabin, and responsive to detection of a cabin heater core having a temperature above a predetermined threshold, output a command to the coolant heater to direct warm or cold fluid to the transmission assembly based on a detected transmission thermal loop temperature.

2. The system of claim 1, wherein the controller is further programmed to, responsive to detection of the cabin heater core having a temperature less than a predetermined threshold, output a command to the coolant heater to direct heat generated by the engine to the cabin thermal loop.

3. The system of claim 1, wherein the controller is further programmed to output a command to the coolant heater to activate and supply heat to the transmission thermal loop.

4. The system of claim 1, wherein the shut-off valve operates based on proportional flow or variable flow.

5. The system of claim 1, wherein an engine thermal loop including the engine, the transmission thermal loop, and the cabin thermal loop collectively include only one coolant pump.

6. The system of claim 1, wherein the controller is further programmed to direct engine coolant to flow to the transmission oil heat exchanger based on a detected engine coolant temperature being less than a detected transmission coolant temperature.

7. A vehicle thermal management system comprising:
an engine thermal loop coupled to a transmission thermal loop and a cabin thermal loop;
a transmission oil heat exchanger (TOHEX) of the transmission thermal loop in fluid communication with a transmission and a shut-off valve;
a coolant heater of the engine thermal loop in selective fluid communication with the transmission thermal loop and the cabin thermal loop; and
a controller programmed to, responsive to detection of a cabin temperature less than a predetermined threshold and regardless of an engine operating condition, output a command to the shut-off valve to release warmed fluid from the transmission thermal loop to the cabin thermal loop and output a command to the coolant heater to release heated fluid to the cabin thermal loop to increase the cabin temperature.

8. The system of claim 7, wherein the thermal loops are included in a hybrid electric vehicle.

9. The system of claim 7, wherein the controller is further programmed to, responsive to detection of the transmission thermal loop having a temperature less than a predetermined threshold, output a command to the coolant heater to release warmed fluid from the engine thermal loop to the TOHEX.

10. The system of claim 7, wherein the TOHEX is a stack-plate unit including separate channels for fluid from the engine thermal loop and fluid from the transmission thermal loop to flow through and exchange heat.

11. The system of claim 7, wherein the controller is further programmed to activate a coolant pump of the engine thermal loop and an automatic transmission fluid pump of the transmission thermal loop to simultaneously transfer fluid to the cabin thermal loop to warm a vehicle cabin.

12. The system of claim 7 further comprising a coolant pump of the engine thermal loop, wherein the controller is further programed to activate the coolant pump to maintain a flow rate of fluid traveling to the transmission thermal loop responsive to detection of an engine off condition or an engine idle condition.

13. The system of claim 7, wherein the controller is further programmed to limit coolant flow via the TOHEX based on detection of a transmission fluid temperature being greater than a predetermined set max limit.

* * * * *